United States Patent [19]

Petersen et al.

[11] 4,220,313
[45] Sep. 2, 1980

[54] VALVE OPERATOR

[75] Inventors: Kenneth M. Petersen; John E. Soulier, both of San Diego, Calif.

[73] Assignee: Merck & Co., Inc., Rahway, N.J.

[21] Appl. No.: 905,246

[22] Filed: May 12, 1978

[51] Int. Cl.$^3$ ............................................. F16K 31/05
[52] U.S. Cl. .................................... 251/280; 251/130; 251/331; 74/520
[58] Field of Search .............. 251/130, 280, 279, 331, 251/138; 74/520

[56] References Cited

U.S. PATENT DOCUMENTS

| | | | |
|---|---|---|---|
| 1,873,405 | 8/1932 | Hodgkins | 251/280 X |
| 2,315,389 | 3/1943 | Benson et al. | 74/44 |
| 2,319,842 | 5/1943 | Benson et al. | 74/52 |
| 2,344,594 | 3/1944 | Bryant | 251/280 X |
| 2,354,987 | 8/1944 | Fawkes | 251/280 X |
| 2,370,604 | 2/1945 | De Craene et al. | 74/520 |
| 2,515,498 | 7/1950 | De Craene et al. | 251/130 X |
| 2,603,102 | 7/1952 | Hobbs | 74/520 |
| 2,759,369 | 8/1956 | Ginocchio | 74/520 |
| 3,515,367 | 6/1970 | Ziaylek | 251/9 |
| 4,050,670 | 9/1977 | Borg et al. | 251/279 X |

FOREIGN PATENT DOCUMENTS

| | | |
|---|---|---|
| 2025300 | 5/1970 | Fed. Rep. of Germany. |
| 1206168 | 8/1959 | France. |
| 1099932 | 1/1968 | United Kingdom. |

Primary Examiner—Arnold Rosenthal
Attorney, Agent, or Firm—Gabriel Lopez; Donald J. Perrella; Julian S. Levitt

[57] ABSTRACT

The present invention provides a valve operator whereby movement of linkage arms connected to a spring loaded movable pressure plate and to a valve stem support opens and closes the valve diaphragm. A manual override clutch assembly disengages the drive means and permits manual operation of the valve.

2 Claims, 5 Drawing Figures

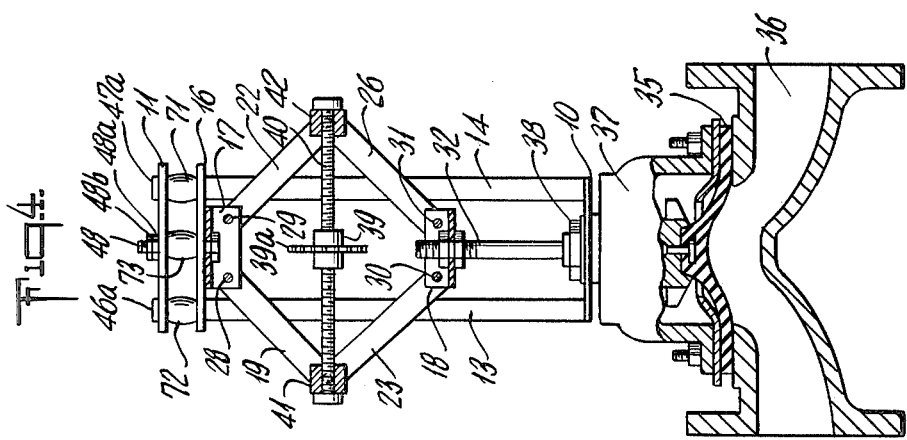
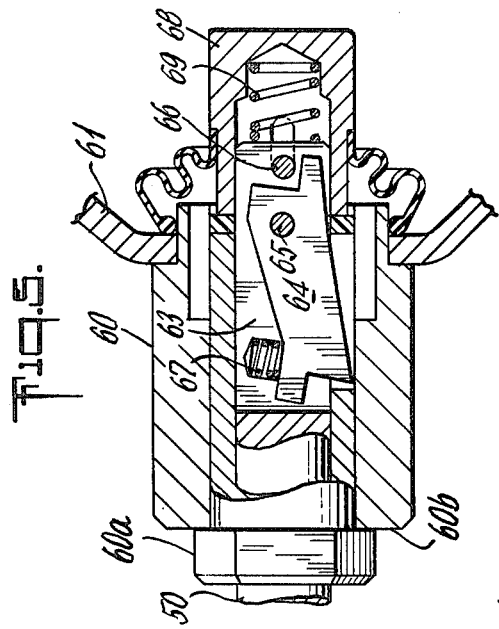
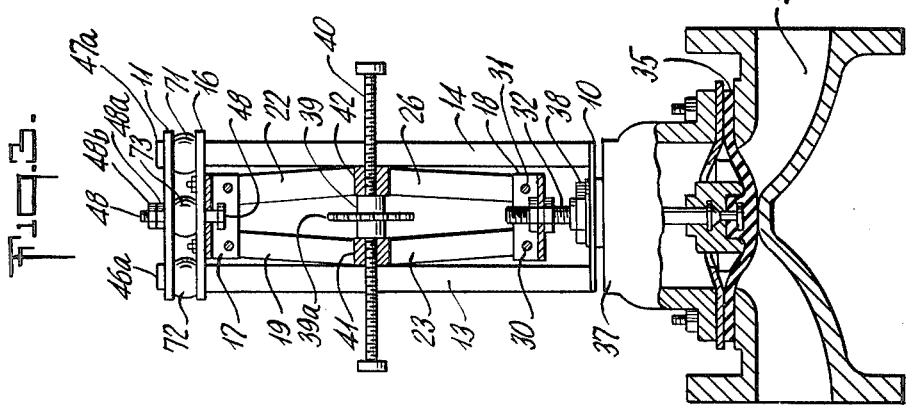

VALVE OPERATOR

BACKGROUND OF THE INVENTION

The use of remotely controlled valve operators on various sliding stem valves is quite common in the process industry. For relatively small valves the currently available direct acting and geared operators are satisfactory. When high seating and unseating forces are encountered, however, as in the case of large diaphragm and gate valves, the currently available operators are generally very bulky and require excessive control air pressure if they are pneumatically operated. The electrically driven operators are generally very complex gear-driven units which require expensive special motors to give the high torques necessary at the end of the travel. In each of these cases, the result is a very expensive valve operator to do this relatively simple job.

OBJECTS OF THE INVENTION

It is an object of the present invention to provide an improved valve operator. Another object is to provide a valve operator adapted to apply extremely high, controlled mechanical forces with relatively low power input. Still another object is to provide a valve operator having positive positioning and which is not subject to pressure changes in the valved line. Yet another object is to provide a valve operator having manual override means. A further object is to provide a lighter, more compact and more economical valve operator. These and other objects of the present invention will be apparent from the following description.

SUMMARY OF THE INVENTION

The present invention provides a valve operator whereby movement of linkage arms connected to a spring loaded movable pressure plate and to a valve stem opens and closes the valve diaphragm. A manual override clutch assembly disengages the mechanical drive means and permits manual operation of the valve.

BRIEF DESCRIPTION OF THE DRAWINGS

FIGS. 3 and 4 are side elevations taken along the line 3—3 of FIG. 1 wherein FIG. 3 shows the valve in closed position and FIG. 4 shows the valve in open position.

FIG. 5 is a detail of the manual crank hub.

DETAILED DESCRIPTION

Figure 1:
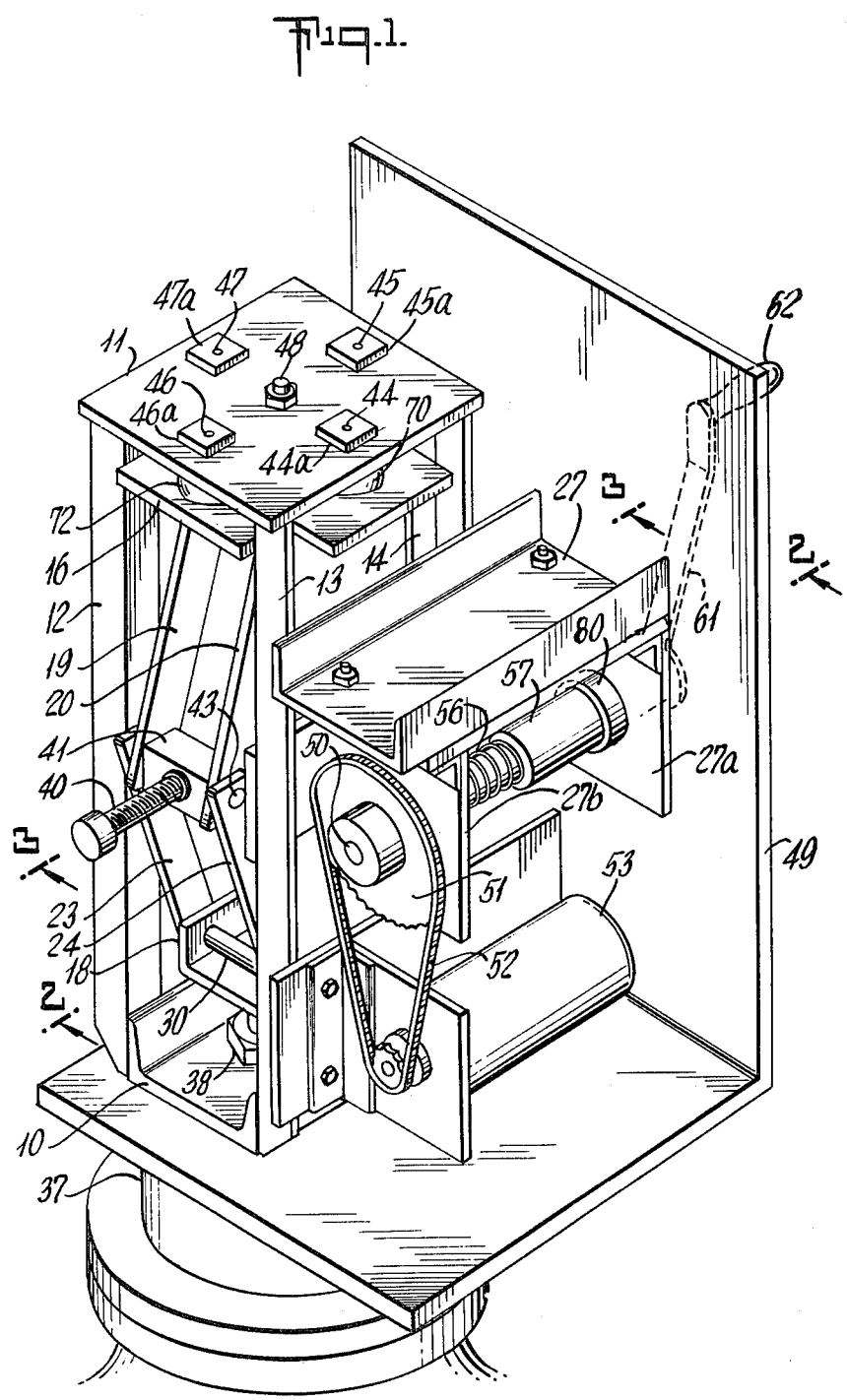
FIG. 1 is a perspective view of the valve operator of the present invention.
Figure 2:
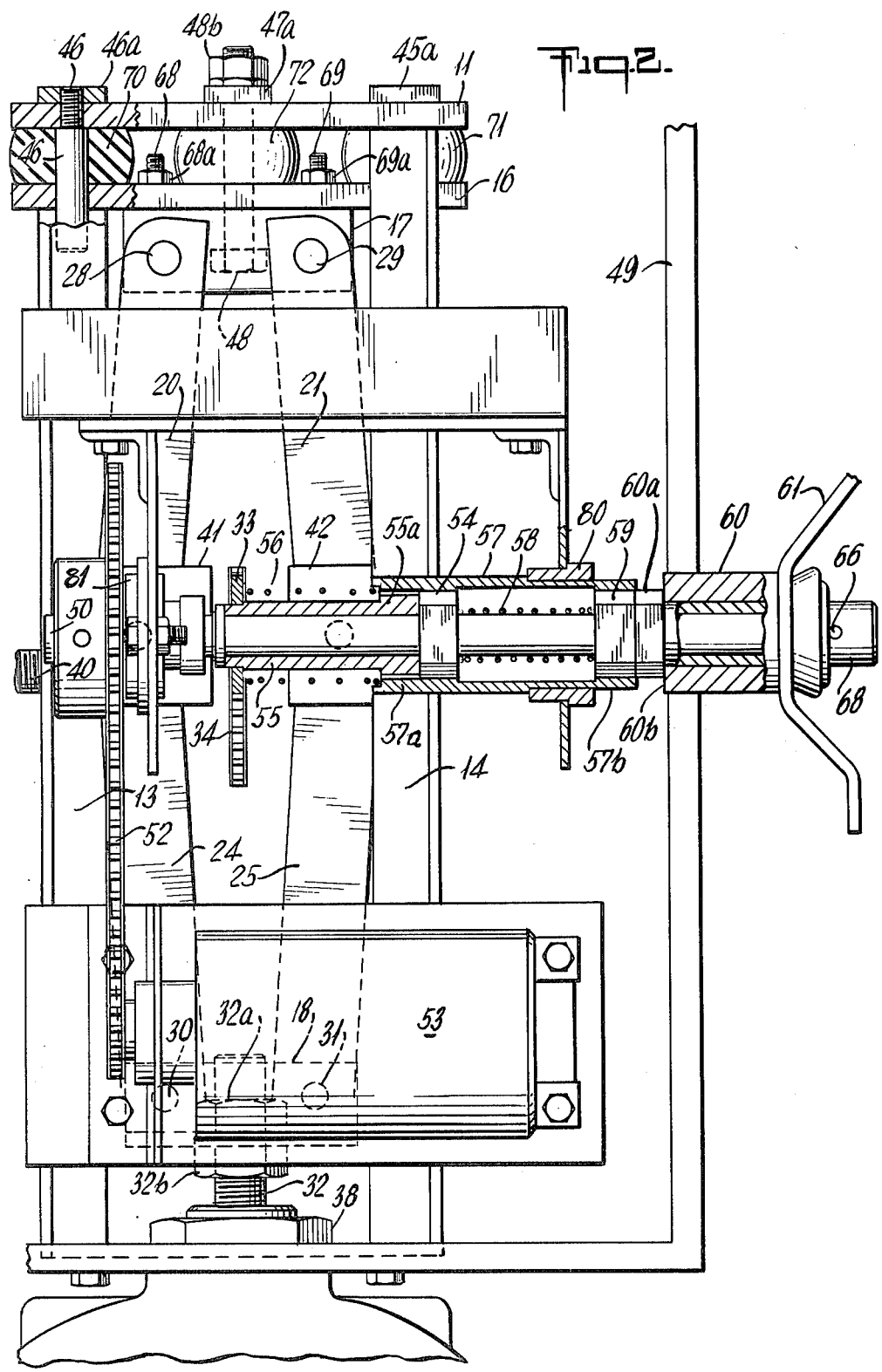
FIG. 2 is a side elevation view taken along the line 2—2 of FIG. 1.

The valve operator of the present invention will now be described with reference to the drawings. A frame assembly is formed from bottom mounting plate 10, top stationary pressure plate 11, and vertical frame members 12, 13, 14 and a fourth vertical frame member (not shown) diagonally opposite member 13. A movable pressure plate 16 is attached to plate 11 by means of guide pins through rubber springs 70, 71, 72 and 73. The threaded ends 44, 45, 46 and 47 of the guide pins protrude through openings in plate 11 and are secured by nuts 44a, 45a, 46a and 47a. A support bracket 17 is attached to plate 16 by means of bolts 68 and 69 and nuts 68a and 69a. Upper linkage arms 19, 20, 21 and 22 are pivotally attached to bracket 17 by pins 28 and 29. Lower linkage arms 23, 24, 25 and 26 are pivotally attached to U-shaped bracket 18 by pins 30 and 31. Valve stem 32 also is attached to bracket 18 by means of upper nut 32a and lower nut 32b.

A screw hub 39 with attached sprocket 39a is integrally mounted on threaded screw 40. Screw 40 has left-hand threads on one side of hub 39 and right-hand threads on the other side of hub 39. Screw 40 is threaded through pivot nuts 41 and 42. Upper linkage arms 19 and 20 and lower linkage arms 23 and 24 are pivotally attached to pivot nut 41 by means of pin 43. Similarly, upper linkage arms 21 and 22 and lower linkage arms 25 and 26 are pivotally attached to pivot nut 42 by a pin (not shown) corresponding to pin 43. A main drive shaft 50 having sprocket 51 is turned by chain 52 driven by motor 53. A second sprocket 33 mounted on sleeve 55 is connected by chain 34 to sprocket 39a.

FIG. 3 shows valve in closed position with diaphragm 35 seated against valve body 36. Rotation of main drive shaft 50 rotates sprocket 39a to turn screw 40 and thereby spread apart the linkage arms. As the linkage arms spread, bracket 18 is raised thereby lifting diaphragm and opening the valve as shown in FIG. 4. In this operation, the head of bolt 48 which is disposed beneath plate 16 acts as a stop to limit downward movement of plate 16. In reverse operation the linkage arms are drawn toward hub 39 to move valve stem 32 down and seat diaphragm 35 against valve body 36. In this operation, rubber springs 70, 71, 72 and 73 which surround guide pins 44, 45, 46 and 47, respectively, limit the upward movement of plate 16 and direct the force of the closing linkage arms downwardly to seat diaphragm 35 against valve body 36.

Before the valve stem 32 is attached to bracket 18, cover plate 49 having bottom opening (not shown) is fitted over valve bonnet 37. Both plates 49 and 10 are secured to bonnet 37 by means of a nut 38. A shaft mounting bracket 27 having downwardly projecting members 27a and 27b is welded to frame assembly vertical frame members 13 and 14 so that a hole in each of members 27a and 27b is in registration with a hole in the vertical member of cover plate 49. The manual clutch override assembly is inserted through these holes through bushings 80 and 81. The manual override clutch assembly comprises:

Main drive shaft 50 having hexagonal spline 54 pinned to the shaft; sleeve 55 having wider hexagonal end 55a fitted over shaft 50 with spring 56 fitted between sprocket 33 and wider end 57a of sleeve 57 urging sleeve 57 into engagement with hexagonal spline 54 and against bushing 80; sleeve 57 having splined end portions 57a and 57b, hexagonal spline 54, and spring 58 urging bushing 59 away from hexagonal spline 54; hub 60 and crank means 61 fitted over the outer portion of shaft 50; the innermost portion 60a of hub 60 being a spline adapted to fit within adjacent splined end 57b of sleeve 57; and crank means 61 having handle 62.

Hub 60 is free wheeling when shaft 50 is engaged by chain 52 and motor 53. Pushing crank means 61 displaces bushing 59 inwardly and moves portion 60a into splined end 57b of sleeve 57 to a point where flange 60b engages the end of portion 57b of sleeve 57. This causes splined end 57a to move toward sprocket 33 and away from hexagonal spline 54 thus disengaging shaft 50 from motor 53 and chain 52, while at the same time coupling shaft 50 to crank means 61 for manual operation. A latch 64 is mounted on pin 65 within slot 63 in shaft 50. As the outer end of hub 60 passes the inner end of latch 64, spring 67 pushes latch 64 outwardly thus locking hub 60 and preventing its return. Stop 66 limits the outward travel of latch 64. Spring 69 maintains release cap 68 in original position as hub 60 is pushed in. To disengage the manual override, release cap 68 is pushed inwardly thereby returning latch 64 to its original position and enabling springs 58 and 56 to return bushing 59 and sleeve 57 to their original positions whereby main drive shaft 50 is again engaged with chain 52 and motor 53.

What is claimed is:

1. In a valve operator for a sliding stem valve for controllably opening and closing a valve diaphragm, said valve operator comprising (1) lower linkage arms pivotally connected at their lower portions to said sliding stem valve and pivotally connected at their upper portions to lower portions of upper linkage arms, (2) said upper linkage arms being pivotally connected at their upper portions to a movable pressure plate attached by guide pins to a top stationary pressure plate such that said movable pressure plate remains substantially parallel to said top stationary pressure plate and (3) actuating means for moving said linkage arms relative to each other such that said sliding stem valve moves relative to said top stationary pressure plate, the improvement which comprises a spring positioned between said movable pressure plate and said top stationary pressure plate such that the movement of said movable pressure plate toward said top stationary pressure plate is limited thereby.

2. The valve operator of claim 1 wherein the actuating means comprises (1) a power driven main shaft connected through a sprocket mounted on a spline sleeve and chain connected to a threaded screw having right and left hand screw threads, and (2) a manual override clutch assembly comprising a splined hub and sleeve means mounted on said main shaft.

* * * * *